United States Patent [19]

South, Jr.

[11] Patent Number: 4,548,977

[45] Date of Patent: Oct. 22, 1985

[54] POLYMER SLURRY PREPARATION

[75] Inventor: Aubrey South, Jr., Bartlesville, Okla.

[73] Assignee: Phillips Petroleum Company, Bartlesville, Okla.

[21] Appl. No.: 679,141

[22] Filed: Dec. 6, 1984

[51] Int. Cl.[4] ............................................. C08K 5/10
[52] U.S. Cl. ..................................... 524/310; 524/609
[58] Field of Search ....................... 524/310, 308, 609

[56] References Cited

U.S. PATENT DOCUMENTS 3,799,454 3/1974 Blackwell .
3,968,289 7/1976 Higbee ................................ 428/195
4,020,031 4/1977 Merrill ................................ 428/419
4,490,499 12/1984 Huybrechts ......................... 524/609

*Primary Examiner*—Lewis T. Jacobs
*Attorney, Agent, or Firm*—Howard P. Doescher

[57] ABSTRACT

A process for producing poly(arylene sulfide) resin slurries exhibiting easier handling and improved performance properties suitable for coating, molding, etc. comprising mixing the polymer with a nonionic surfactant in the absence of a liquid diluent and then blending the resulting admixture with a reinforcing material in a liquid diluent.

8 Claims, No Drawings

POLYMER SLURRY PREPARATION

BACKGROUND OF THE INVENTION

This invention relates to improved poly(arylene sulfide) compositions and to methods of preparing poly(arylene sulfide) resin slurries.

Arylene sulfide polymers are ideally suited for a wide variety of uses because of the high temperature stability of such polymers and their ability to withstand chemical attack. These polymers are known for their desirable characteristics as coating compositions and for molding into a variety of products. It is often desirable to incorporate various reinforcing agents into arylene sulfide polymers prior to use as coatings, molding compositions, and other uses. It is often difficult to handle and process slurries and dispersions of these polymers, especially when these compositions contain high loadings of reinforcing agents and at the same time it is desirable to obtain cured products having desirable performance characteristics. The present invention is directed to the preparation of arylene sulfide polymer slurries, which are easier to handle and at the same time provide compositions that can be cured into products having improved performance properties.

Accordingly, an object of this invention is to provide arylene sulfide polymer compositions that can be easily handled and processed It is a further object of this invention to provide a method for producing slurries of arylene sulfide polymers which can be readily processed into products having desirable characteristics.

Other objects, aspects as well as the several advantages of the invention will be apparent to those skilled in the art upon reading the specification and the appended claims.

SUMMARY OF THE INVENTION

In accordance with the invention, slurries of arylene sulfide polymers having desirable characteristics are produced by intimately combining an arylene sulfide polymer with at least one non-ionic surfactant in the absence of a liquid diluent, and then blending the admixture thus formed with a reinforcing material in a liquid diluent to produce a slurry. The slurry can then be further processed and utilized as a coating composition, molding composition, or other use as desired.

In a specific embodiment of the invention, a poly(phenylene sulfide) known as PPS, composition prepared by separately pre-mixing PPS and a nonionic surfactant comprising polyoxyethlated vegetable oil followed by blending with a glass-fibers and water not only provides an easier handling more pourable premix but when cured results in a product exhibiting better performance properties than products prepared from a mixture in which all of the ingredients were simultaneously mixed together.

DETAILED DESCRIPTION OF THE INVENTION

The invention is applicable for use with any normally solid, heat curable, high molecular weight arylene sulfide polymer that can be formed into fiber, film, or other articles. Arylene sulfide polymers which can be employed in the process of this invention include arylene sulfide polymers which have a melt flow of at least about 20 and generally within the range of about 50 to about 400 and higher (determined by the method of ASTM D 1238-70, modified into a temperature of 316° C. using a 5-kg weight, the value being expressed as g/10 min.). Thus, the arylene sulfide polymers can be linear, branched or lightly cross-linked. Although the method by which the polymers of this description are produced is not critical, preferably the polymers employed in the process is prepared by use of polyhaloaromatic compounds, alkali metal sulfides, and organic amides. For example, the arylene sulfide polymers for use in this invention can be produced by the method of U.S. Pat. No. 3,354,129 which is hereby incorporated by reference. The preferred type polymer employed for use in fiber and film applications is prepared by use of a p-dihalobenzene, an alkali metal sulfide, an organic amide, and an alkali metal carboxylate as in U.S. Pat. No. 3,919,177. The disclosure of U.S. Pat. No. 3,919,177 is hereby incorporated by reference.

The invention is applicable for use with any nonionic surfactant. Suitable nonionic surfactants include polyoxyethylated vegetable oils.

Specifically polyoxyethylated castor oil, polyoxyethylated saffron flower oil, polyoxyethylated peanut oil, polyoxyethylated corn oil, polyoxyethylated cottonseed oil, polyoxyethylated soya bean oil, and the like, and mixture thereof are considered to be suitable. In general it is considered desirable for the polyoxyethylated vegetable oil to have an average number of oxyethylene groups per molecule in the range of 6 to 30, and preferably in the range of 8 to 20. Presently preferred are polyoxyethylated derivatives of castor oil having a viscosity at 25° C. in the range of 500 to 1000 cps, a specific gravity in the range of 1.04 to 1.07, and a flash point in the range of 275° to 295° C.

Other suitable nonionic surface active agents include ethoxylated alkylphenols, ethoxylated aliphatic alcohols, carboxylic esters, carboxylic amides, and polyoxyalkylene oxide block copolymers. Preferred materials are alkylphenoxypoly(ethyleneoxy)ethanol. Exemplary of such materials is the material sold by Rohm and Haas under the trademark Triton X-100 wherein the alkyl is t-octyl and the moles of ethylene oxide per mole of phenolic compound is within the range of 9-10.

Other nonionic surfactants that can be used include ethoxylated linear alcohols, alkylaryl polyether alcohols and the like, including mixtures thereof.

The invention is also applicable for use with any suitable reinforcing agent depending upon desired use of the final product. Glass fibers are presently preferred as the reinforcing agent but other reinforcing agents, such as silica, mineral fillers such as talc, calcium carbonate, zinc oxide, iron oxide, titanium dioxide, etc. and mixture thereof, can also be used.

Any liquid can be used as the diluent provided the liquid is inert to the other components of the slurry and to the substrate, and provided it is readily volatized prior to or during the subsequent heating or curing step. The diluents presently preferred are water and ethylene glycol. Other diluents which can be used include alcohols such as methyl alcohol, ethyl alcohol, and isopropyl alcohol, and hydrocarbons such as benzene, toluene, heptane, cyclohexane, and various hydrocarbon mixtures such as kerosene, diesel fuel, and the like. Less preferred diluents which can be used include chlorinated biphenyl, dimethyl phthalate, and the like. Mixtures of the diluents can be used.

The ranges for the ingredients used can be based on:

| Ingredients | parts by weight |
|---|---|
| PPS | 100 |
| Surfactant | 0.5 to 10 (preferred 1 to 5) |
| Glass Fibers | 10-100 |
| Water (diluent) | 50-200 |

As indicated hereinbefore it is important that the nonionic surface active agent be mixed with the arylene sulfide polymer, which is preferably in particulate form, in the absence of a diluent or liquid. Mixing of the polymer and surfactant can be carried out at ambient conditions in any suitable mixing equipment.

Following preparation of the nonionic surfactant-/arylene sulfide polymer admixture, this admixture is then blended with a diluent such as water containing a reinforcing material. This step of the blending process can be carried out at ambient conditions also. Any suitable type of mixing equipment can be used so long as an intimate final mixture of polymer, surfactant, and reinforcing material is obtained as a slurry having the desired characteristics set forth herein.

The final dispersion of the invention can be utilized, for example, as a coating composition by applying to a substrate by any conventional means, such as spraying or with a blade or the like, and then cured for instance by heating to an elevated temperature of at least about 500° F. It is also within the scope of the invention to use the final dispersion as a molding composition by charging to a suitable type of mold, and applying heat and pressure to form a desired molded article.

EXAMPLE

This example describes the process used to illustrate the operability of this invention by demonstrating the criticality in the way surfactants are added to a glass-filled poly(phenylene sulfide) composition during the initial ingredient compounding or mixing process. To a one-gallon paint can was added 800 grams of distilled water, 600 grams of poly(phenylene sulfide) (Ryton FS-2, melt flow 100-140 grams/10 minutes as determined by test method ASTM D 1238 at 600° F., 316° C., using a 5 kilogram load), 16 grams of EL-620 surfactant (a polyoxyethylated castor oil from GAF), and 400 grams of 1 inch chopped glass fibers (433-AC-227 from Owens Corning) and the mixture mechanically shaken on a RED DEVIL paint mixer for 10 minutes. Molded plaques were then prepared by placing 800 grams of the wet resin mixture into a 11 inch × 11 inch × 0.15 inch mold and heated for 10 minutes at 600° F. (316° C.) in a press which was left partially open to remove water. A slight pressure was then applied to the mold by closing the press for 9 minutes while maintaining the same temperature. A platen pressure of 15,000 pounds was applied at the elevated temperature for 1 minute and then while maintaining the 15,000 pounds pressure the press was water cooled for 10 minutes. The sample was cut into a 10 inch × 9 inch piece and placed into a positive pressure press at 25 tons ram force for 10 minutes. The sample was removed and cut into strips 8 inches × 1 inch × 0.125 inch for tensile testing and 3 inches × 0.5 inch × 0.125 inch for impact testing. Before the strips were tested they were annealed for 2 hours at 350° F. (177° C.).

The aforementioned process was repeated except the poly(phenylene sulfide) polymer and polyoxyethylated castor oil surfactant were premixed in a Waring blender for 1 to 3 minutes prior to the subsequent mixing with water and glass fibers in the RED DEVIL paint mixer. The premixing of the surfactant and poly(phenylene sulfide) is the invention. The performance testing results from the two described mixing procedures are listed in TABLE I where it can be seen that the inventive premixing of polymer and surfactant gives significantly improved molded performance properties. In addition, a slurry from the process was easier to handle and poured more freely than without pretreatment of the poly(phenylene sulfide) polymer with the surfactant.

TABLE I

| Effect of Surfactant Addition on a Poly(Phenylene Sulfide)-Glass Fiber Composition | | | |
|---|---|---|---|
| | | Runs | |
| | | Control | (Pre-Mix) Invention |
| A. Composition: grams | | | |
| 1. Poly(phenylene sulfide)* | | 600 | 600 |
| 2. Surfactant, EL-620** | | 16 | 16 |
| 3. Chopped glass, 1 inch | | 400 | 400 |
| 4. Distilled water | | 800 | 800 |
| B. Performance Properties (Molded) | Test Method | | |
| 1. Tensile Modulus, MPa | ASTM D 638 | 4077 | 4778 |
| 2. Tensile Break, MPa | ASTM D 638 | 18.2 | 43.4 |
| 3. Izod Impact, J/M | ASTM D 256 | | |
| a. Notched | | 424 | 635 |
| b. Unnotched | | 490 | 750 |

*Ryton FS-2 from Phillips Petroleum Company
**Polyoxyethylated castor oil from GAF That which is claimed is:

1. A process for producing poly(arylene sulfide) slurries suitable for coating and molding comprising:
   (a) combining 100 weight parts solid poly(arylene sulfide) resin with at least about 0.5 weight parts of at least one nonionic surfactant under conditions to produce an intimate admixture, and
   (b) blending the admixture obtained in (a) with a reinforcing material in a liquid diluent medium.

2. A process according to claim 1 wherein said reinforcing material is glass fibers and said diluent is water.

3. A process according to claim 1 wherein said nonionic surfactant is a polyoxyethylated vegetable oil.

4. A process according to claim 1 wherein said poly(arylene sulfide) resin is poly(phenylene sulfide).

5. A process according to claim 1 wherein said poly(arylene sulfide) resin is poly(phenylene sulfide), said diluent is water, and said reinforcing material is glass fibers.

6. A process according to claim 1, wherein based on 100 parts weight of said resin, the composition contains from about 0.5 to about 10 weight parts nonionic surfactant, about 10-100 weight parts glass fibers, and about 50-200 weight parts diluent.

7. A process according to claim 6, wherein said nonionic surfactant is a polyoxyethylated vegetable oil.

8. A process according to claim 7 wherein said nonionic surfactant is polyoxyethylated castor oil and said resin is poly(phenylene sulfide).

* * * * *